United States Patent
Kunitake et al.

(10) Patent No.: US 9,663,063 B2
(45) Date of Patent: May 30, 2017

(54) AIR BAG DEVICE

(71) Applicant: HONDA MOTOR CO., LTD., Tokyo (JP)

(72) Inventors: Yukihiro Kunitake, Saitama (JP); Taro Shimizu, Saitama (JP); Yuuji Nishina, Saitama (JP); Katsuhiko Imai, Saitama (JP); Yuji Ishizuka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/913,503

(22) PCT Filed: Jul. 8, 2014

(86) PCT No.: PCT/JP2014/068158
§ 371 (c)(1),
(2) Date: Feb. 22, 2016

(87) PCT Pub. No.: WO2015/025630
PCT Pub. Date: Feb. 26, 2015

(65) Prior Publication Data
US 2016/0214563 A1 Jul. 28, 2016

(30) Foreign Application Priority Data
Aug. 23, 2013 (JP) .................. 2013-173574

(51) Int. Cl.
*B60R 21/20* (2011.01)
*B60R 21/237* (2006.01)
(Continued)

(52) U.S. Cl.
CPC .......... *B60R 21/237* (2013.01); *B60R 21/201* (2013.01); *B60R 21/205* (2013.01); *B60R 21/215* (2013.01); *B60R 21/2165* (2013.01)

(58) Field of Classification Search
CPC ...... B60R 21/201; B60R 21/205; B60R 21/20
See application file for complete search history.

(56) References Cited

U.S. PATENT DOCUMENTS 6,612,607 B1   9/2003 Takahashi
6,682,093 B2 * 1/2004 Tajima .................. B60R 21/201
                                                    280/728.2
(Continued)

FOREIGN PATENT DOCUMENTS

JP   11-42998 A      2/1999
JP   2003-252160 A   9/2003
(Continued)

OTHER PUBLICATIONS

Matayoshi Masayuki, Vehicle Interior Panel, Jan. 17, 2013, JPO JP 2013-010455 A, Machine Translation of Description.*
(Continued)

*Primary Examiner* — James English
(74) *Attorney, Agent, or Firm* — Westerman, Hattori, Daniels & Adrian, LLP

(57) ABSTRACT

Provided is an air bag device such that a tear line can be efficiently cleaved. An air bag device is provided with: an air bag folded in such a manner as to be expandable by gas from an inflator; a packing cloth wrapping the folded air bag; and a pair of front and rear lids that close an air bag housing portion and that are both-opened as the tear line at the center is cleaved upon deployment. The packing cloth includes an opening portion. The opening portion is positioned at substantially the center in the left-right direction of an automobile with respect to the pair of front and rear lids and is offset forwardly of the automobile.

14 Claims, 7 Drawing Sheets

(51) Int. Cl.
*B60R 21/201* (2011.01)
*B60R 21/205* (2011.01)
*B60R 21/215* (2011.01)
*B60R 21/2165* (2011.01)

(56) References Cited

U.S. PATENT DOCUMENTS

| | | | | |
|---|---|---|---|---|
| 7,845,672 B2* | 12/2010 | Onohara | ............... | B60R 21/20 280/728.2 |
| 8,419,048 B2* | 4/2013 | Yamaji | ............... | B60R 21/201 280/728.3 |
| 2003/0197358 A1* | 10/2003 | Hawthorn | ............. | B60R 21/237 280/743.1 |
| 2006/0267313 A1 | 11/2006 | Yasuda et al. | | |
| 2013/0241184 A1* | 9/2013 | Sakai | ............... | B60R 21/205 280/743.1 |
| 2015/0115577 A1* | 4/2015 | Miura | ............... | B60R 21/201 280/728.2 |

FOREIGN PATENT DOCUMENTS

| | | | |
|---|---|---|---|
| JP | 2005082021 A | * | 3/2005 |
| JP | 2006-335152 A | | 12/2006 |
| JP | 2013-10455 A | | 1/2013 |

OTHER PUBLICATIONS

Kurata et al., Air Bar Device, Mar. 4, 2002, JPO JP 2003-252160 A, Machine Translation of Description.*

International Search Report dated Oct. 7, 2014, issued in counterpart International Application No. PCT/JP2014/068158 (2 pages).

* cited by examiner

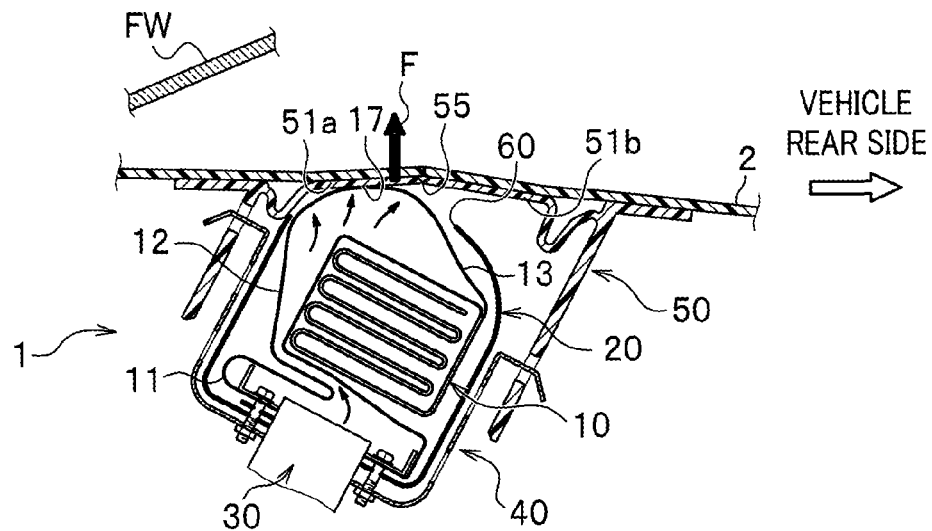
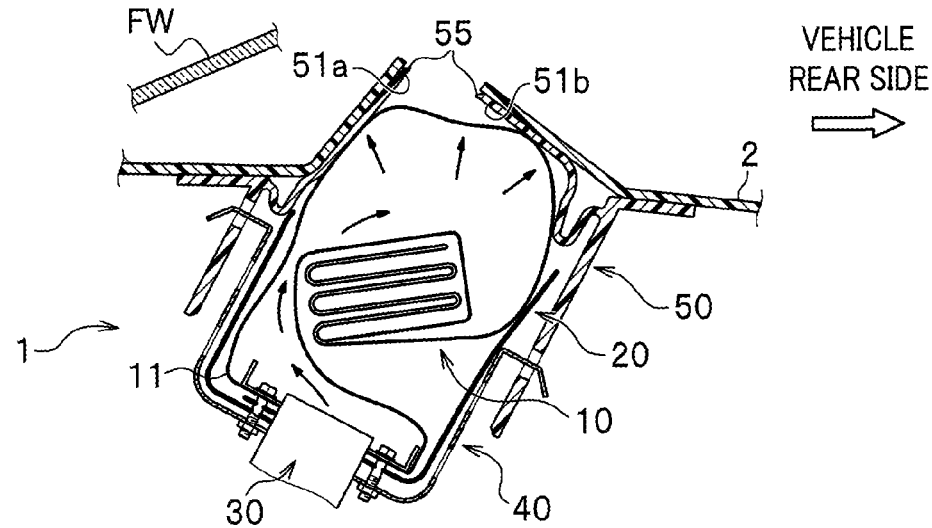
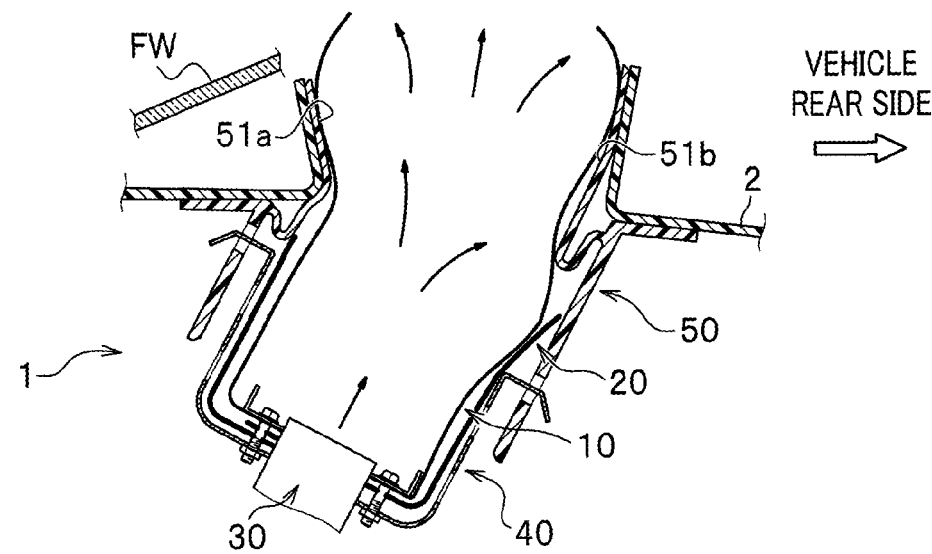

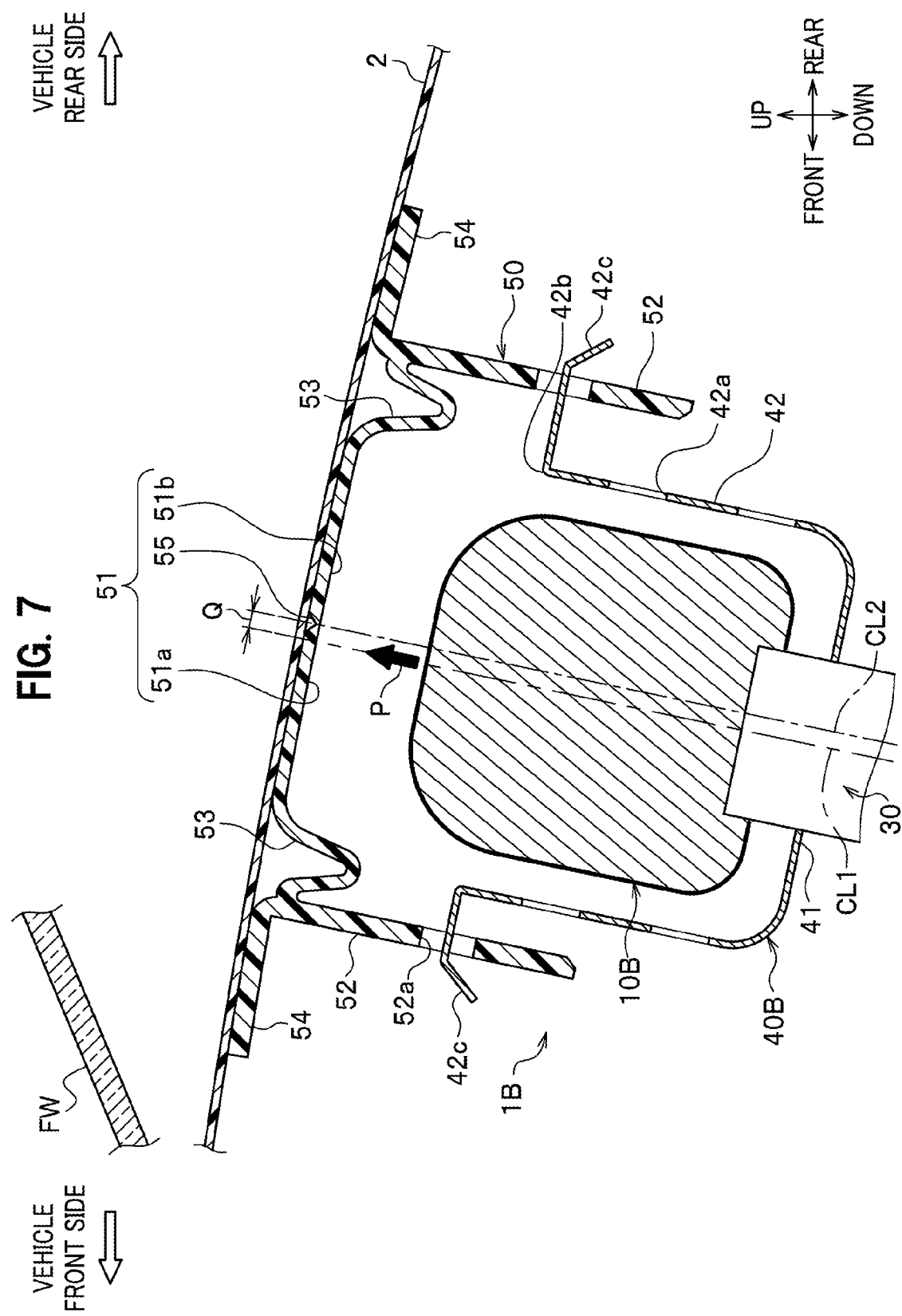

AIR BAG DEVICE

TECHNICAL FIELD

The present invention relates to an air bag device including, for example, a both sides opening lid.

BACKGROUND ART

An air bag, which restrains an occupant by its expansion into a vehicle compartment when an automobile is impacted, is sometimes housed in a retainer in a state of being wrapped in a packing cloth in order to stabilize its folded state. For example, Patent Document 1 discloses an air bag device in which a folded air bag is wrapped in the packing cloth, and upon collision of a vehicle, the air bag is expanded by gas generated from an inflator, to break the packing cloth as well as to cleave the lid, and is then expanded into the vehicle compartment. The packing cloth is formed with an opening portion for checking a folded state of the air bag. Further, the lid is adapted to be cleaved at a central tear line thereof, to be both-opened.

CITATION LIST

Patent Literature

{Patent Document 1}
Japanese Patent Application Publication No. 2003-252160 (claim 1, FIG. 3)

SUMMARY OF INVENTION

Technical Problem

However, the air bag device disclosed in Patent Document 1 has the following problems.
(1) When the packing cloth is used in order to stabilize the air bag which is intricately folded, a portion of expansion force of the air bag is used to break the packing cloth, and energy for cleaving the lid or an instrument panel tends to be reduced.
(2) When an amount to lighten the tear line is increased in order to cleave the tear line with a small energy, a mark of the tear line is easy to appear on a surface of the lid or the instrument panel. Upon request for high quality of today's interior design, there is a limit to the amount to lighten the tear line.

The present invention has been made in view of the above points, and an object thereof is to provide an air bag device capable of efficiently cleave the tear line.

Solution to Problem

In order to achieve the above object, the present invention is an air bag device including an air bag which is folded to be expanded by gas from an inflator, and a pair of lids which close a housing portion for the air bag and are both-opened by cleavage of a central tear line thereof upon expansion of the air bag, wherein the air bag to be expanded is brought into contact with one of the pair of lids in a biased manner, to cleave the tear line.

According to the present invention, since the air bag to be expanded is brought into contact with one of the pair of lids in a biased manner, to cleave the tear line, expansion force of the air bag is applied to the one of the pair of the lids in a biased manner. As a result, shearing force generated in the tear line is greater than that when the air bag is brought into contact with the pair of the lids in a uniform manner, and it is possible to efficiently cleave the tear line. Note that, as a specific method in which the air bag is brought into contact with one of the pair of lids in a biased manner, the air bag is, for example, disposed offset (close) to one of the pair of the lids.

Further, the present invention is an air bag device including an air bag which is folded to be expanded by gas from an inflator, a packing cloth for wrapping the folded air bag, and a pair of lids which close a housing portion for the air bag and are both-opened by cleavage of a central tear line thereof upon expansion of the air bag, wherein by adjusting a position of an opening portion provided in the packing cloth, the air bag to be expanded is brought into contact with one of the pair of lids in a biased manner, to cleave the tear line.

According to the present invention, since the air bag to be expanded is brought into contact with one of the pair of lids in a biased manner, to cleave the tear line, by adjusting the position of the opening portion provided in the packing cloth, the expansion force of the air bag is applied to the one of the pair of the lids in a biased manner. As a result, shearing force generated in the tear line is greater than that when the air bag is brought into contact with the pair of the lids in a uniform manner, and it is possible to efficiently cleave the tear line.

Further, the present invention is an air bag device including an air bag which is folded to be expanded by gas from an inflator, a packing cloth for wrapping the folded air bag, and a pair of front and rear lids which close a housing portion for the air bag and are both-opened by cleavage of a central tear line thereof upon expansion of the air bag, wherein the packing cloth includes an opening portion, and wherein the opening portion is positioned at a substantially central portion in a left-right direction of a vehicle with respect to the pair of front and rear lids, and is offset forwardly or rearwardly of the vehicle.

According to the present invention, since the opening portion is provided in advance in the packing cloth, a portion of the air bag projected from the opening portion is brought into direct contact with the pair of lids without requiring breakage of the packing cloth at initial expansion of the air bag. Further, since the opening portion is positioned at a substantially central portion in a left-right direction of a vehicle with respect to the pair of front and rear lids, and is offset forwardly or rearwardly of the vehicle, the air bag projected from the opening portion is brought into contact with the pair of front and rear lids in a biased manner forwardly or rearwardly. Therefore, the expansion force of the air bag is applied to either of the pair of the lids in a biased manner, and it is possible to effectively generate shearing force in the tear line. As a result, it is possible to efficiently cleave the tear line while preventing loss of the expansion force.

Further, the present invention is an air bag device including an air bag which is folded to be expanded by gas from an inflator, a packing cloth for wrapping the folded air bag, and a pair of front and rear lids which close a housing portion for the air bag and are both-opened by cleavage of a central tear line thereof upon expansion of the air bag, wherein the packing cloth includes an opening portion for projecting a portion of the air bag upon expansion of the air bag, and wherein the opening portion is offset forwardly or rearwardly of a vehicle with respect to the pair of front and rear lids.

According to the present invention, since the opening portion for projecting a portion of the air bag is provided in advance in the packing cloth, the portion of the air bag projected from the opening portion is brought into direct contact with the pair of lids without requiring breakage of the packing cloth at initial expansion of the air bag. Further, since the opening portion is offset forwardly or rearwardly of the vehicle with respect to the pair of front and rear lids, the air bag projected from the opening portion is bought into contact with the pair of front and rear lids in a biased manner forwardly or rearwardly. Therefore, the expansion force of the air bag is applied to either of the pair of the lids in a biased manner, and it is possible to effectively generate shearing force in the tear line. As a result, it is possible to efficiently cleave the tear line while preventing loss of the expansion force.

Further, it is preferable that the air bag is folded such that the gas from the inflator disposed on the lower side reaches an upper surface portion of the air bag through either a front surface portion or a rear surface portion of the air bag, and the opening portion is offset to one side corresponding to either the front surface portion or the rear surface portion of the air bag. With this configuration, the expansion force of the air bag is increased in the vicinity of a corner composed of the upper surface portion and either the front surface portion or the rear surface portion of the air bag. Since a portion in which the expansion force of the air bag is increased and an offset direction of the opening portion correspond to each other, it is possible to project the portion, in which the expansion force of the air bag is increased, from the opening portion, so that the portion can be brought into contact with one of the pair of the lids.

Further, it is preferable that the opening portion is disposed across from the upper surface portion of the folded air bag to either the front surface portion or the rear surface portion of the air bag. With this configuration, since the opening portion is provided at a portion in which a flow path of the gas is bent, it is possible to efficiently transmit the expansion force of the air bag to the lids while the packing cloth has a function for holding the air bag.

Further, it is preferable that the air bag is housed below an instrument panel provided in a front portion of the vehicle, and the opening portion is offset to a front windshield side. With this configuration, since the opening portion is offset to the front windshield side, the portion of the air bag projected from the opening portion is brought into contact with a lid on the front windshield side (front side). Therefore, the expansion force of the air bag is intensively applied to the front lid, and it is possible to effectively generate shearing force in the tear line. Further, since the air bag is expanded toward the front windshield at first, and is expanded toward the seat side after contact with the front windshield, it is possible to prevent the air bag from being in direct contact with an occupant at an early expansion stage of the air bag.

Further, it is preferable that upper surfaces of the air bag and the packing cloth are inclined so as to approach the pair of the lids as they go from the rear to the front. With this configuration, since the upper surfaces of the air bag and the packing cloth are inclined so as to approach the pair of the lids as they go from the rear to the front, the air bag is brought into contact with the front lid at first upon expansion of the air bag. Therefore, the expansion force of the air bag is intensively applied to the front lid, and it is possible to effectively generate shearing force in the tear line. Further, since the air bag is expanded toward the front windshield at first, and is expanded toward the seat side after contact with the front windshield, it is possible to prevent the air bag from being in direct contact with an occupant at an early expansion stage of the air bag.

Further, it is preferable that the air bag is folded such that the gas from the inflator disposed on the lower side reaches an upper surface portion of the air bag through a front surface portion of the air bag, and a front surface portion side of the air bag is closer to the lids than a rear surface portion side of the air bag. With this configuration, since the front surface portion side of the air bag is closer to the lids than the rear surface portion side of the air bag, it is possible to transmit the expansion force of the air bag to the front lid reliably and strongly in conjunction with the offset of the opening portion.

Further, it is preferable that the air bag is housed in a box-like retainer which is open at upper end portions thereof in a state of being wrapped in the packing cloth, and the opening portion of the packing cloth is provided in an area upper than upper end portions of side walls of the retainer. With this configuration, since the opening portion of the packing cloth is provided in an area upper than the upper end portions of side walls of the retainer, it is possible to prevent the air bag exposed from the opening portion of the packing cloth from being damaged due to contact with the upper end portions (edges) of the side walls of the retainer.

Further, it is preferable that a plurality of engaging portions for engaging with the retainer are provided spaced from each other in the left-right direction at one end portion of the packing cloth either forward or rearward of the vehicle, and a width dimension of the opening portion of the packing cloth in the left-right direction of the vehicle is reduced as it goes either forwardly or rearwardly of the vehicle. With this configuration, since the opening portion is formed, for example, in a triangular or a trapezoidal shape so that the width dimension thereof in the left-right direction of the vehicle is reduced as it goes either forwardly or rearwardly of the vehicle, it is possible to ensure a tension line around the opening portion when pulling the engaging portions of the packing cloth to engage them with the retainer in order to wrap the air bag. This improves assembly of the packing cloth.

Further, it is preferable that a peripheral edge of the opening portion of the packing cloth is composed of a plurality of linear portions and arcuate portions provided between the linear portions. With this configuration, it is possible to prevent wear of a punching blade for forming the opening portion of the packing cloth.

Further, it is preferable that the packing cloth includes perforated fragile portions to be broken by expansion of the air bag at the left and right sides of the opening portion, and each end portion on the opening portion side of the fragile portions is continuous with the linear portion. With this configuration, since each end portion on the opening portion side of the fragile portions is continuous with the linear portion, it is easy to uniformly form a bridge width of the perforated fragile portions as compared with a case where it is continuous with the arcuate portion.

Further, the present invention is an air bag device including an air bag which is folded to be expanded by gas from an inflator, a packing cloth for wrapping the air bag, and a pair of lids which close a housing portion for the air bag and are both-opened by cleavage of a tear line thereof upon expansion of the air bag, wherein the packing cloth includes an opening portion for projecting a portion of the air bag upon expansion of the air bag, and wherein the opening portion is disposed such that the portion of the air bag projected from the opening portion is brought into contact with one of the pair of lids in a biased manner.

According to the present invention, since the opening portion for projecting a portion of the air bag is provided in advance in the packing cloth, the portion of the air bag is projected from the opening portion without requiring breakage of the packing cloth at initial expansion of the air bag. Further, since the opening portion is disposed such that the portion of the air bag projected from the opening portion is brought into contact with one of the pair of lids in a biased manner, the expansion force of the air bag is applied to either of the pair of the lids in a biased manner, and it is possible to effectively generate shearing force in the tear line. As a result, it is possible to efficiently cleave the tear line while preventing loss of the expansion force.

Further, the air bag is preferably configured such that the portion of the air bag projected from the opening portion is brought into substantially perpendicular contact with the one of the pair of lids. With this configuration, it is possible to cleave the tear line by efficiently converting the expansion force of the air bag to the shearing force of the tear line, as compared with a case where the air bag is brought into contact with one of the pair of the lids at a shallow angle (an acute angle).

Advantageous Effects of Invention

According to the present invention, it is possible to provide an air bag device capable of efficiently cleaving a tear line.

BRIEF DESCRIPTION OF DRAWINGS

FIG. 5A is a view for describing an operation of the air bag device, and shows a state of a first stage;
FIG. 5B is a view for describing the operation of the air bag device, and shows a state of a second stage;
FIG. 5C is a view for describing the operation of the air bag device, and shows a state of a third stage;
FIG. 7 is a cross-sectional view of the air bag device according to a second modification.

DESCRIPTION OF EMBODIMENTS

Next, an embodiment of the present invention will be described in detail with reference to the accompanying drawings. Note that, as for directions shown by arrows in each figure, "front-rear" and "up-down" show the front-rear direction and the up-down direction of a vehicle, and "left-right" shows the left-right direction (vehicle width direction) as viewed from a driver's seat, respectively.

Figure 1:
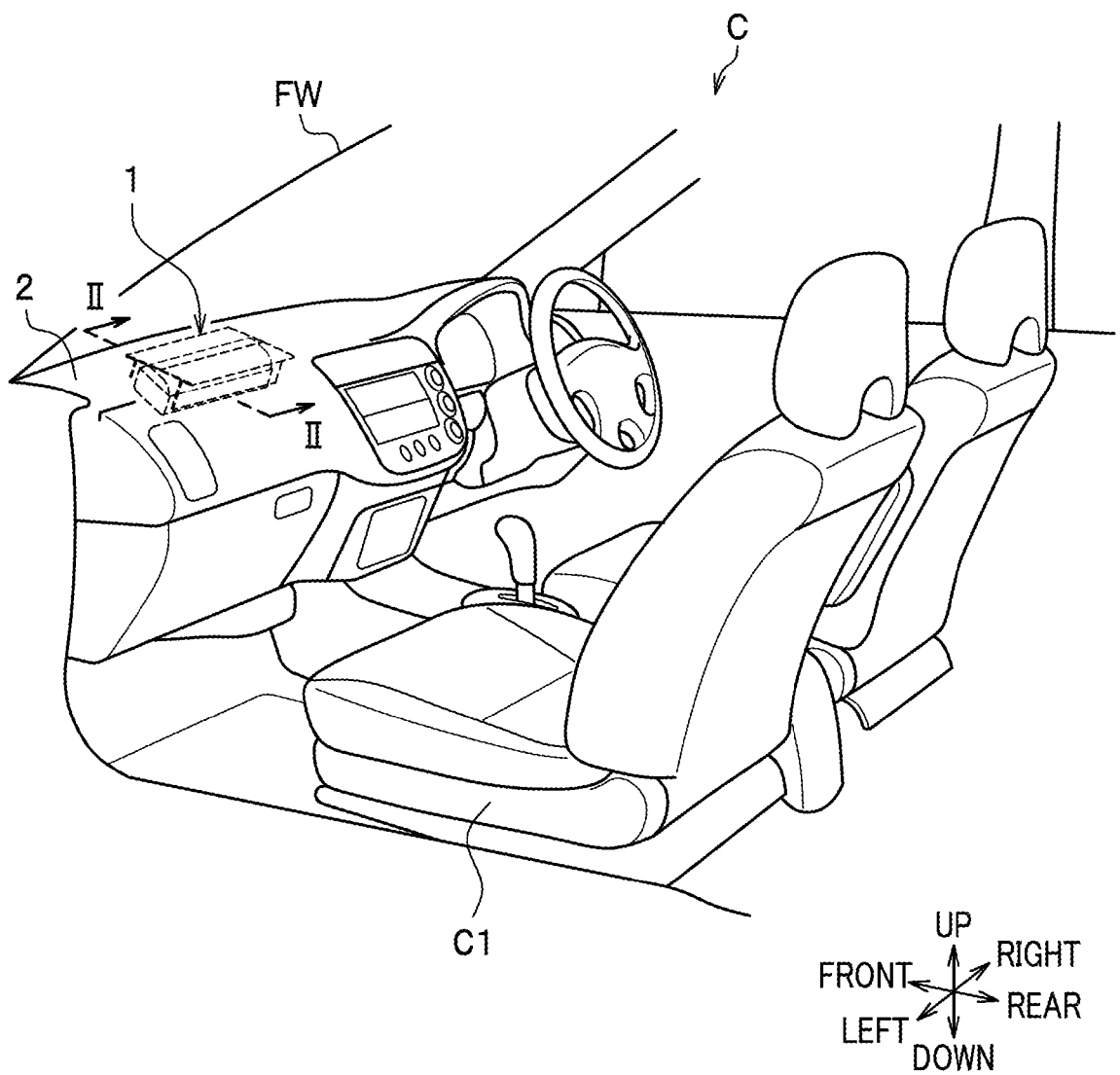
FIG. 1 is a perspective view of an automobile equipped with an air bag device according to the present embodiment.

An air bag device 1 according to the present embodiment is a device for protecting an occupant seated in a passenger seat C1 by expansion and deployment when an automobile C receives an impact. As shown in FIG. 1, the air bag device 1 is provided below an instrument panel 2 in front of the passenger seat C1. Note that, an upper surface of the instrument panel 2 is inclined downwardly from a windshield FW side (vehicle front side) to a passenger seat side (vehicle rear side) (see FIG. 2).

Figure 2:
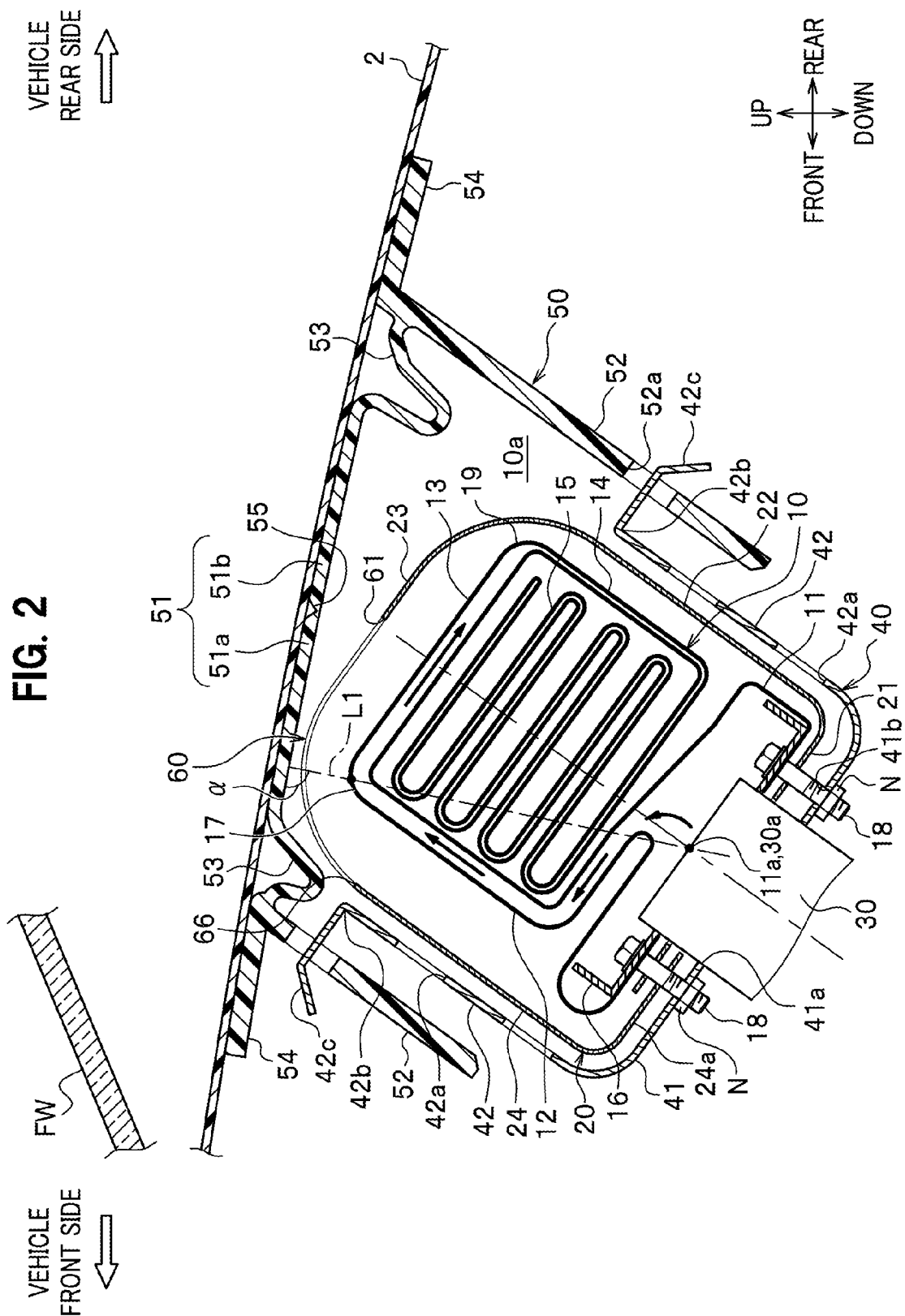
FIG. 2 is a cross-sectional view of the air bag device viewed from an arrow II-II in FIG. 1.

As shown in FIG. 2, the air bag device 1 has a folded bag shaped air bag 10, a cloth packing 20 for wrapping the folded air bag 10, an inflator 30 for injecting gas into the air bag 10, a retainer 40 for housing the air bag 10 wrapped in the packing cloth 20, and a lid member 50 for closing a housing portion 10a for the air bag 10.

The lid member 50 is a resin member constituting an outlet of the air bag 10, and is integrally formed by injection molding or the like. The lid member 50 is welded to a back surface of the instrument panel 2. The lid member 50 has a pair of lids 51, side wall portions 52, hinge portions 53, and flange portions 54.

The pair of lids 51 is a lid (door) which is both-opened in the front-rear direction upon expansion of the air bag 10, and is composed of a front lid 51a and a rear lid 51b. A rear end portion of the front lid 51a and a front end portion of the rear lid 51b are continuous with each other via a tear line 55. The tear line 55 is a fragile portion which is broken down by the expanded air bag 10, and is formed thinner than the lids 51. A front end portion of the front lid 51a and a rear end portion of the rear lid 51b are continuous with the side wall portions 52 via the hinge portions 53, 53. Note that, although not shown, left and right side end portions of the front lid 51a and the rear lid 51b are continuous with the left and right side wall portions.

The side wall portion 52 is a rectangular tubular wall body elongated in the left-right direction, to surround the air bag 10 and the like. The side wall portion 52 is closed with the pair of the lids 51 at an upper end side thereof, and is open at a lower end side thereof.

The hinge portions 53 are portions to be bent upon deployment of the front lid 51a and the rear lid 51b, and are formed in a substantial U-shape in a sectional view. The hinge portions 53 are continuous with upper end portions of the front and rear side wall portions 52. Accordingly, since the front lid 51a and the rear lid 51b in an open state are supported by the hinge portions 53, the front lids 51a and the rear lid 51b are not scattered upon expansion of the air bag 10.

The flange portions 54 are frame-like portions extending outwardly from the upper end portions of the side wall portions 52. Upper surfaces of the flange portions 54 and upper surfaces of the pair of the lids 51 are welded to the back surface of the instrument panel 2.

The air bag 10 is a bag shaped member for restraining the occupant by expansion and deployment into a vehicle compartment upon collision of the vehicle. In normal state, the air bag 10 is folded to be easily expanded by gas from the inflator 30. Specifically, the air bag 10 in a folded state mainly includes a base portion 11, a front surface portion 12 extending upwardly from the base portion 11, an upper surface portion 13 extending rearwardly from an upper end of the front surface portion 12, a rear surface portion 14 extending downwardly from a rear end of the upper surface portion 13, and a bellows portion 15 which is continuous with a lower end of the rear surface portion 14 and is folded in a bellows shape. In other words, the air bag 10 is folded in a state where the rear surface portion 14, the upper surface portion 13, the front surface portion 12, and the base portion 11 are wound around the bellows portion 15.

An upper end portion of the inflator 30 is inserted into the base portion 11, and the gas is introduced into the base portion 11 upon expansion of the air bag 10. The gas introduced into the base portion 11 flows through the front surface portion 12, the upper surface portion 13, the rear surface portion 14, and the bellows portion 15 in this order. A front corner portion 17 in which the upper end of the front surface portion 12 and a front end of the upper surface portion 13 are continuous with each other is a portion in which flow direction of the gas flowing from bottom to top is changed by hitting, and a force expanding outwardly is strong at the front corner portion 17. Further, since the front corner portion 17 is closer to the inflator 30 than a rear corner portion 19 in which the rear end of the upper surface portion 13 and an upper end of the rear surface portion 14 are continuous with each other, momentum of the gas is also strong.

Further, a base plate 16 for fixing the air bag 10 to the retainer 40 is provided inside the base portion 11. The base plate 16 is fixed to a bottom wall 41 of the retainer 40 via four stud bolts 18.

Figure 3:
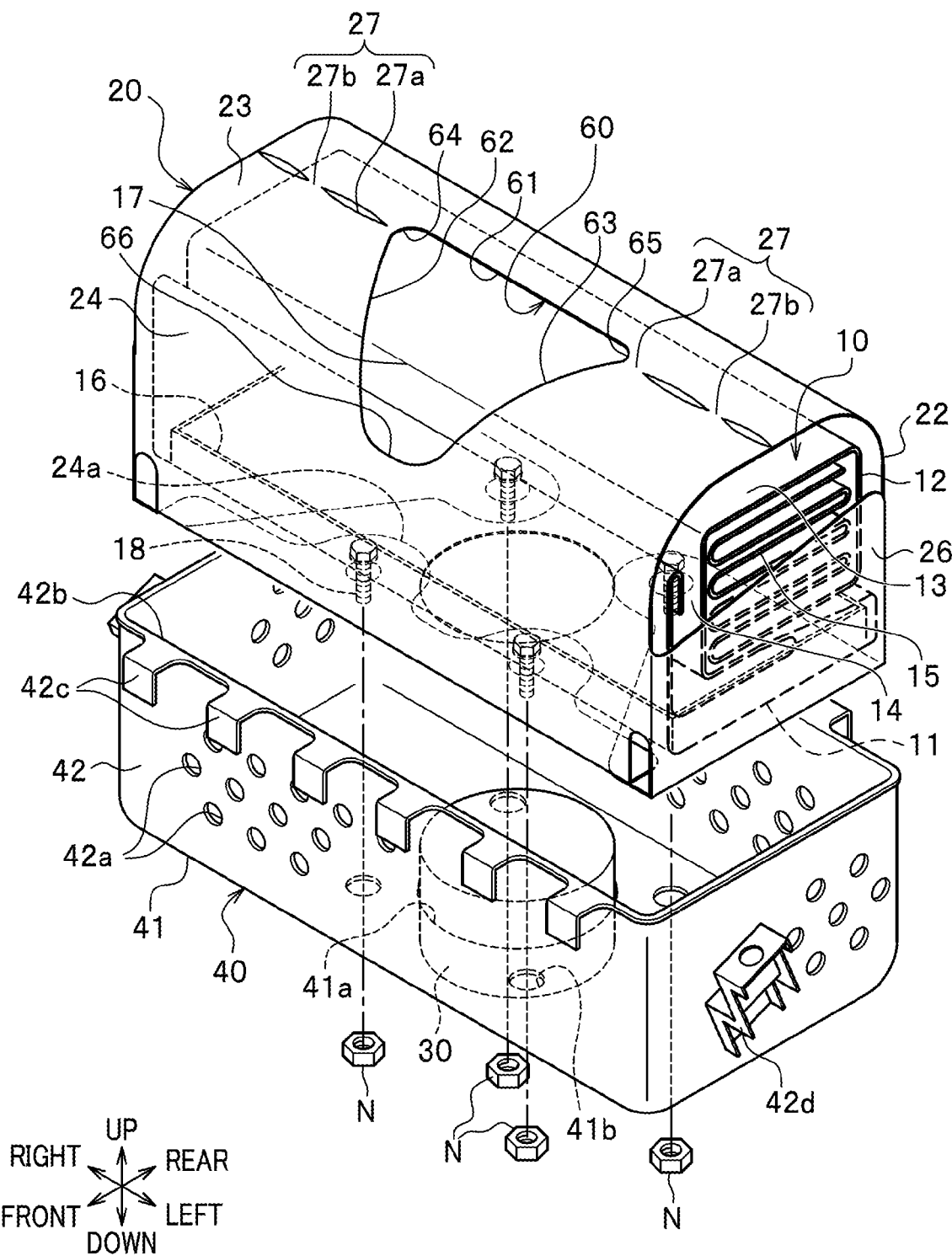
FIG. 3 is an exploded perspective view of the air bag device viewed down from upper left.
Figure 4A:
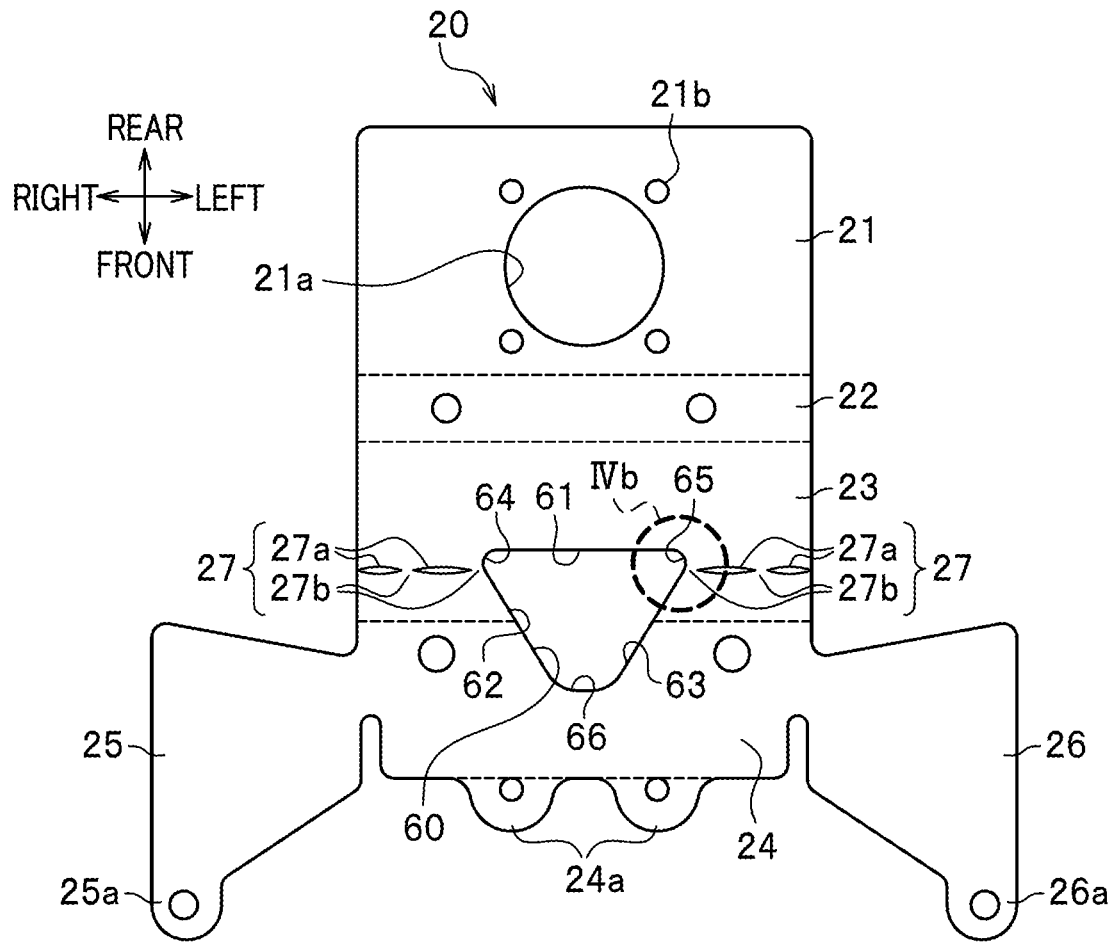
FIG. 4A is a developed view of the air bag device.

As shown in FIGS. 2, 3, 4A, the packing cloth 20 is a fabric member for wrapping the folded air bag 10. The packing cloth 20 includes a bottom cloth portion 21, a rear cloth portion 22 continuous with a rear end portion of the bottom cloth portion 21, an upper cloth portion 23 continuous with an upper end portion of the rear cloth portion 22, a front cloth portion 24 continuous with a front end portion of the upper cloth portion 23, and a right cloth portion 25 and a left cloth portion 26 (see FIG. 4A) respectively continuous with right and left side end portions of the front cloth portion 24. Further, the packing cloth 20 includes an opening portion 60 for projecting the air bag 10 upon the expansion, and fragile portions 27 which are broken by expansion force of the air bag 10.

The bottom cloth portion 21 includes an inflator insertion hole 21a into which the inflator 30 is inserted, and four bolt insertion holes 21b into which the stud bolts 18 are inserted (see FIG. 4A). A plurality of (two in the present embodiment) engaging portions 24a, which are folded back to a bottom portion (the base portion 11) of the air bag 10 to engage with the front side two stud bolts 18, are projectingly formed in a lower end portion of the front cloth portion 24. The two engaging portions 24a are provided spaced from each other in the left-right direction. Engaging portion 25a, 26a, which are folded to the bottom portion (base portion 11) of the air bag 10 to be respectively engaged with the rear side two stud bolts 18, are respectively provided at lower end portions of the right cloth portion 25 and the left cloth portion 26.

The opening portion 60 is a through-hole having substantially triangular shape in a developed state shown in FIG. 4A, and is formed across the upper cloth portion 23 and the front cloth portion 24. The opening portion 60 has a function of projecting a portion of the air bag 10 from the opening portion 60 before the fragile portions 27 are completely broken. The opening portion 60 is provided in a substantially central portion in the left-right direction of the packing cloth 20. The opening portion 60 is formed below the front lid 51a (see FIG. 2). In other words, the opening portion 60 is formed offset forwardly of the automobile C with respect to the pair of the lids 51. The front surface portion 12, the upper surface portion 13 and the front corner portion 17 of the air bag 10 are exposed from the opening portion 60. As shown in FIG. 3, a peripheral edge of the opening portion 60 is composed of three linear portions 61, 62, 63 constituting three sides of a triangle and three arcuate portions 64, 65, 66 constituting vertices of the triangle. The linear portion 61 is extended in the left-right direction at a substantially central portion in the left-right direction and the front-rear direction of the upper cloth portion 23. The linear portion 61 is formed in a length dimension of about one third (preferably one third or more, and one-half or less) of a width dimension in the left-right direction of the upper cloth portion 23. The other two linear portions 62, 63 are extended across the upper cloth portion 23 and the front cloth portion 24, and are provided in a substantial V-shape to approach each other as they go to the front side. The arcuate portion 66 between the two linear portions 62, 63 is located above later-described upper end portions 42b of peripheral walls 42 of the retainer 40 (see FIGS. 2, 3).

Figure 4B:
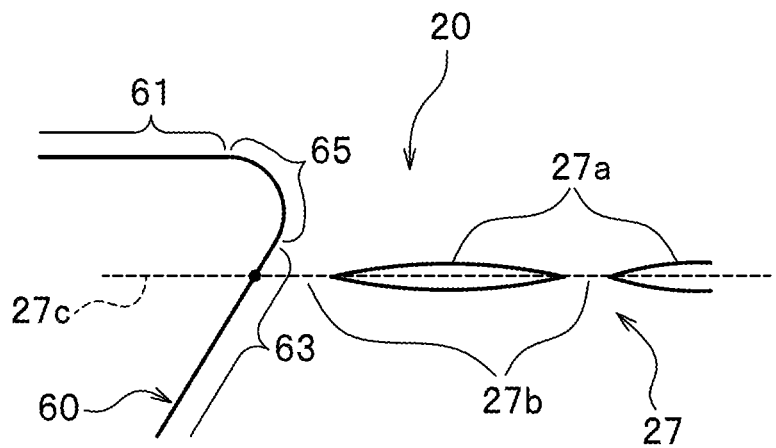
FIG. 4B is an enlarged plan view of IVb portion shown in FIG. 4A.

The fragile portions 27 are linear portions which are broken by the expansion force of the air bag 10, and are extended in the left-right direction on left and right sides of the opening portion 60. A plurality of splits 27a and bridges 27b are arranged alternately in each fragile portion 27. As shown in FIG. 4B, end portions on the opening portion 60 side of the fragile portions 27 are formed at positions continuous with the two linear portions 62, 63 instead of the two arcuate portions 64, 65 (only the linear portion 63 side is shown). In other words, extensions 27c of the fragile portions 27 intersect with the linear portions 62, 63. This makes it possible to form a width dimension of the bridges 27b precisely and uniformly, as compared with a case where the extensions 27c of the fragile portions 27 intersect with the arcuate portions 64, 65.

Here, a relationship between the opening portion 60 and the engaging portions 24a will be described. As shown in FIG. 4A, the opening portion 60 is formed in a substantially triangular shape, and a distance between the left and right linear portions 62, 63 is short as they go to the front side. Therefore, there is no opening portion 60 on a virtual line connecting the left side engaging portion 24a and the bridge 27b of the fragile portion 27 on the left side of the opening portion 60. Further, there is no opening portion 60 on a virtual line connecting the right side engaging portion 24a and the bridge 27b of the fragile portion 27 on the right side of the opening portion 60. As a result, when pulling the engaging portions 24a to engage them with the stud bolts 18 in order to wrap the air bag 10 with the packing cloth 20, it is easy to apply tension to the packing cloth 20, and thus the packing cloth 20 hardly wrinkles.

As shown in FIGS. 2, 3, the inflator 30 is a member for injecting the gas into the air bag 10. The upper end portion of the inflator 30 is inserted into the base portion 11 of the air bag 10. When an acceleration sensor or the like (not shown) detects an impact on the automobile C, the inflator 30 is ignited to inject the gas by an instruction from a control unit (not shown).

The retainer 40 is a container for housing the air bag 10 wrapped in the packing cloth 20, and is made of a box-like steel member which is open at an upper end thereof. The retainer 40 mainly includes the bottom wall 41 and the peripheral walls 42 rising from a periphery of the bottom wall 41. An inflator insertion hole 41a into which the inflator 30 is inserted and four bolt insertion holes 41b into which the stud bolts 18 are inserted are provided in the bottom wall 41. By tightening nuts N after inserting the stud bolts 18 into the bolt insertion holes 41b, the air bag 10, the packing cloth 20 and the retainer 40 are securely fastened together. A plurality of lightening through-holes 42a are drilled in the peripheral walls 42. Further, a plurality of folded portions 42c of an inverted L shape in a side view are provided in the upper end portions 42b of the front and rear peripheral walls 42. Brackets 42d for fixing the retainer 40 to the vehicle body are respectively provided on the outside of the left and right peripheral walls 42.

Here, as shown in FIG. 2, the instrument panel 2 and the pair of lids 51 are inclined downwardly from the front to the rear. Further, the upper surface portion 13 of the air bag 10 and the upper cloth portion 23 of the packing cloth 20 are also inclined downwardly from the front to the rear. Inclination angle of the upper surface portion 13 of the air bag 10 and the upper cloth portion 23 of the packing cloth 20 is greater than that of the instrument panel 2 and the pair of lids 51. That is, the upper surface portion 13 of the air bag 10 and the upper cloth portion 23 of the packing cloth 20 are inclined so as to approach the pair of the lids 51 as they go from the rear to the front. Therefore, a front side portion of the upper surface portion 13 of the air bag 10 is easily brought into contact with the pair of the lids 51 (front lid 51a) earlier than a rear side portion of the upper surface portion 13 of the air bag 10.

Further, as shown in FIG. 2, the air bag 10 is disposed inclined such that the front corner portion 17 is closer to the pair of lids 51 than the rear corner portion 19 in a state of being housed in the retainer 40. This makes it possible to transmit the expansion force of the front corner portion 17 to the front lid 51a more efficiently. Note that, it is preferable that a portion of the air bag 10 projected from the opening portion 60 is brought into contact with the front lid 51a substantially at right angles. In this way, it is possible to efficiently convert the expansion force of the air bag 10 to shearing force of the tear line 55, as compared with a case where the air bag 10 is brought into contact with the front lid 51a at a shallow angle (an acute angle). Specifically, it is preferable that the air bag 10 is disposed inclined such that, for example, in a sectional view shown in FIG. 2, an angle α formed between a rear surface of the front lid 51a and a straight line L1 (that is, an expansion direction of the air bag 10) connecting the front corner portion 17 with a center point 11a of the base portion 11 (center point 30a of the inflator 30) is about 90°. In this way, the air bag 10 is easily brought into contact with the front lid 51a at right angles upon expansion thereof.

The air bag device 1 according to the present invention is basically configured as described above. Next, an operation of the air bag device 10 will be described in detail with reference to FIGS. 1 to 5C (mainly FIGS. 5A, 5B, 5C).

As shown in FIG. 5A, the gas injected from the inflator 30 to the base portion 11 of the air bag 10 flows to the upper surface portion 13 through the front surface portion 12 while changing its direction at the front corner portion 17. At this time, since the opening portion 60 of the packing cloth 20 is formed across from the upper surface portion 13 of the air bag 10 to the front surface portion 12 of the air bag 10, the front corner portion 17 and its peripheral portion, which is a portion of the air bag 10, is projected from the opening 60, to expand outwardly. The air bag 10 projected from the opening portion 60 is brought into direct contact with the front lid 51a, to push up the front lid 51a. As a result, a large shearing force F is applied to the tear line 55 between the front lid 51a and the rear lid 51b, so that the tear line 55 starts to be cleaved.

Note that, since the front corner portion 17 of the air bag 10 is closer to the lids 51 than the rear corner portion 19, it is possible to transmit larger expansion force to the lids 51 (front lid 51a). Further, since the upper surface portion 13 of the air bag 10 is inclined so as to approach the pair of lids 51 as it goes from the rear to the front, it is possible to bring the air bag 10 into contact with the front lid 51a at first. Further, since the air bag 10 is projected from the opening portion 60 to be in direct contact with the front lid 51a before (or at the same time when) the expansion force is used to break the fragile portions 27 of the packing cloth 20, it is possible to push up the front lid 51a with a relatively large force.

Next, as shown in FIG. 5B, when the air bag 10 continues to expand, the fragile portions 27 (see FIGS. 3, 4A, 4B) of the packing cloth 20 are cleaved, so that the upper surface portion 13 and the rear surface portion 14 of the air bag 10 start to expand. As a result, the front lid 51a and the rear lid 51b are pushed up by the air bag 10, to be both-opened around the hinge portion 53. In this case, since the tear line 55 is cleaved at first at an early stage of the expansion of the air bag 10, it is possible to prevent breakage of the hinge portions 53 and scattering of the lids 51.

Next, as shown in FIG. 5C, when the air bag 10 continues to expand up to the bellows portion 15, the air bag 10 jumps out from the lids 51, to be expanded into the vehicle compartment. In this case, the air bag 10 is expanded toward the seat side after contact with a front windshield FW.

As described above, with the air bag device 1 according to the present embodiment, since the opening portion 60 for projecting a portion (the front corner portion 17 and its peripheral portion) of the air bag 10 is formed in advance in the packing cloth 20, the portion of the air bag 10 projected from the opening portion 60 is brought into direct contact with the front lid 51a without requiring breakage of the fragile portions 27 of the packing cloth 20 at initial expansion of the air bag 10. Further, since the opening portion 60 is offset forwardly of the automobile C with respect to the pair of front and rear lids 50, the air bag 10 projected from the opening portion 60 is brought into contact with the front lid 51a in a biased manner. Therefore, the expansion force of the air bag 10 is applied to the front lid 51a in the biased manner, and it is possible to effectively generate the shearing force F in the tear line 55. As a result, it is possible to efficiently cleave the tear line 55 while preventing loss of the expansion force.

Further, since the air bag 10 is folded such that the gas from the inflator 30 disposed in the lower side reaches the upper surface portion 13 of the air bag 10 through the front surface portion 12 of the air bag 10, the expansion force of the air bag 10 is increased in the vicinity of the front corner portion 17 composed of the front surface portion 12 and the upper surface portion 13 of the air bag 10. Since the opening portion 60 is offset to the front surface portion 12 side, the front corner portion 17 in which the expansion force of the air bag 10 is increased and an offset direction of the opening portion 60 correspond to each other. Therefore, it is possible to project the front corner portion 17 and its peripheral portion, in which the expansion force is strong in the air bag 10, from the opening portion 60, to be in touch with the front lid 51a.

Further, according to the air bag device 1, since the opening portion 60 is offset to the front windshield FW side, the portion of the air bag 10 projected from the opening portion 60 is brought into contact with the front lid 51a on the front windshield FW side. Therefore, the expansion force of the air bag 10 is intensively applied to the front lid 51a, and it is possible to effectively generate the shearing force F in the tear line 55. Further, since the air bag 10 is expanded toward the front windshield FW at first, and then expanded toward the passenger seat C1 side after contact with the front windshield FW, it is possible to prevent the air bag 10 from being in direct contact with the occupant at an early expansion stage.

Further, since the air bag 10 is folded such that the gas from the inflator 30 disposed in the lower side reaches the upper surface portion 13 through the front surface portion 12 of the air bag 10, and the front surface portion 12 side of the air bag 10 is closer to the pair of the lids 51 than the rear surface portion 14 side of the air bag 10, it is possible to transmit the expansion force of the air bag 10 to the front lid 51a reliably and strongly in conjunction with the offset of the opening portion 60.

Further, since the air bag 10 is housed in the box-like retainer 40 which is open at the upper end portions 42b thereof in a state of being wrapped in the packing cloth 20, and the opening portion 60 is formed in an area upper than the upper end portions 42b of the peripheral walls 42 of the retainer 40, it is possible to prevent the air bag 10 exposed from the opening portion 60 of the packing cloth 20 from being damaged due to contact with the upper end portions 42b (edges) of the peripheral walls 42 of the retainer 40.

Further, since the opening portion 60 is formed, for example, in a triangular or a trapezoidal shape so that the width dimension thereof in the left-right direction of the vehicle is reduced as it goes in the front direction of the vehicle, it is possible to ensure a tension line around the opening portion 60 when pulling the engaging portions 24a of the packing cloth 20 to engage them with the stud bolts 18 of the retainer 40 in order to wrap the air bag 10. This improves assembly of the packing cloth 20.

Further, since the peripheral edge of the opening portion 60 is composed of the three linear portions 61, 62, 63 and the arcuate portions 64, 65, 66 provided between the linear portions 61, 62, 63, it is possible to prevent wear of the punching blade for forming the arcuate portions 64, 65, 66 in the packing cloth by forming the punching blade in a round shape.

Further, since the packing cloth 20 includes perforated fragile portions 27 to be broken by the expansion of the air bag 10 at the left and right sides of the opening portion 60, and end portions on the opening portion 60 side of the fragile portions are respectively continuous with the linear portions 62, 63, it is easy to uniformly form a width dimension of the bridges 27b of the perforated fragile portions 27 as compared with a case where the fragile portions 27 are continuous with the arcuate portions 64, 65 having a large manufacturing error.

Further, with the air bag device 1 according to the present embodiment, since the opening portion 60 for projecting the portion of the air bag 10 is formed in advance in the packing cloth 20, the portion of the air bag 10 is projected from the opening portion 60 without requiring breakage of the fragile portions 27 of the packing cloth 20 at initial expansion of the air bag 10. Further, since the opening portion 60 is disposed such that the portion of the air bag 10 projected from the opening portion 60 is brought into contact with the front lid 51a in a biased manner, the expansion force of the air bag 10 is applied to the front lid 51a in a biased manner, and it is possible to effectively generate the shearing force F in the tear line 55. As a result, it is possible to efficiently cleave the tear line 55 while preventing the loss of the expansion force.

Further, since the air bag 10 is configured such that the portion of the air bag 10 projected from the opening portion 60 is in perpendicular contact with the front lid 51a, it is possible to cleave the tear line 55 by efficiently converting the expansion force of the air bag 10 to the shearing force F of the tear line 55, as compared with a case where the air bag 10 is brought into contact with the pair of the lids 51 at a shallow angle (an acute angle).

Next, an air bag device 1A according to a first modification will be described with reference to FIG. 6. The air bag device 1A according to the first modification differs from the above-described embodiment mainly in that (1) an opening portion 60 of a packing cloth 20A is offset to the rear side, (2) a gas flow path of the air bag 10A is in communication with the base portion 11, the rear surface portion 14, the upper surface portion 13, the front surface portion 12, and the bellows portion 15 in this order, and (3) inclination of the air bag 10A is substantially parallel with the instrument panel 2.

Figure 6:
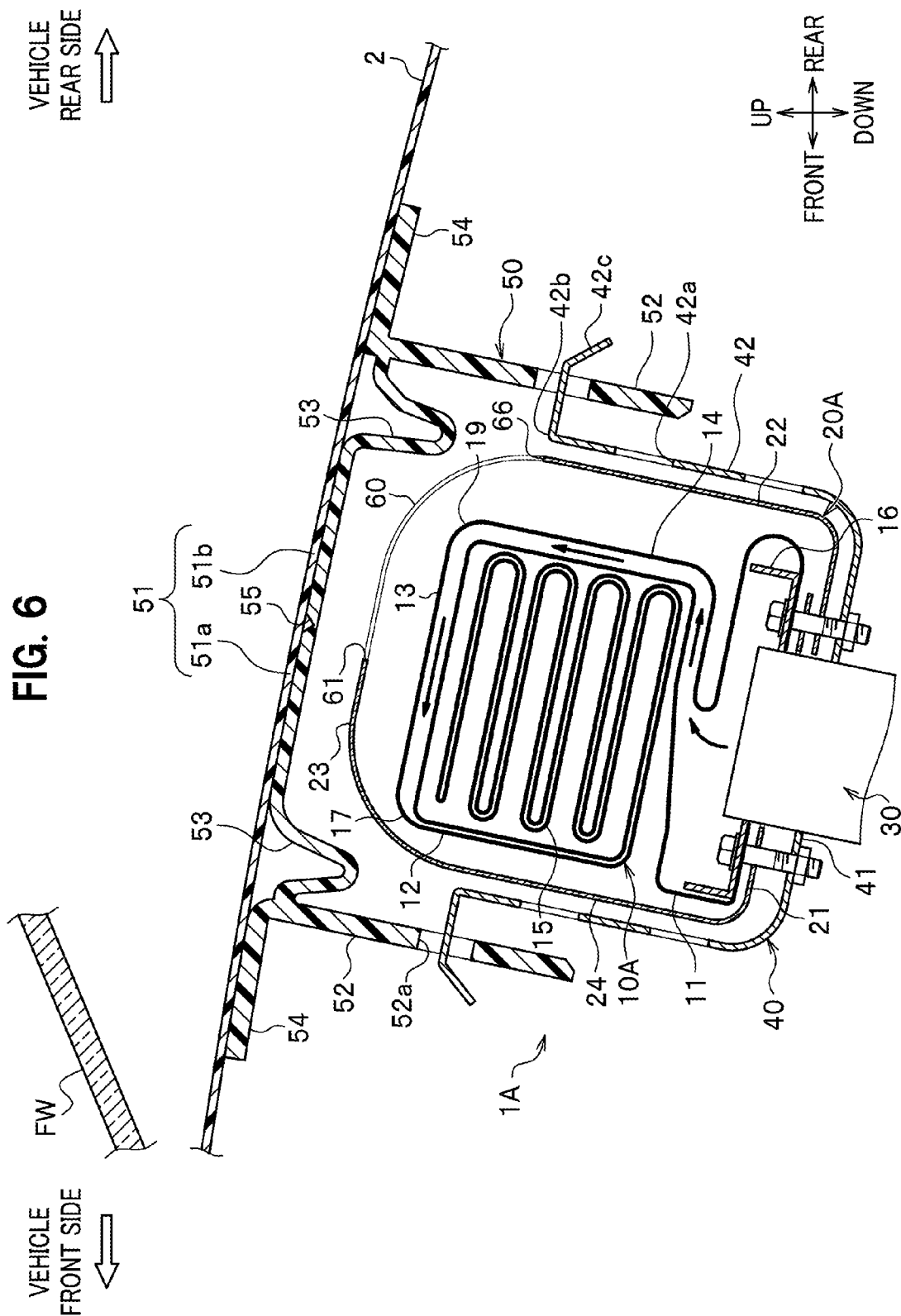
FIG. 6 is a cross-sectional view of the air bag device according to a first modification.

As shown in FIG. 6, the air bag 10A mainly includes the base portion 11, the rear surface portion 14 extending upwardly from the base portion 11, the upper surface portion 13 extending forwardly from the upper end of the rear surface portion 14, the front surface portion 12 extending downwardly from the front end of the upper surface portion 13, and the bellows portion 15 which is continuous with a lower end of the front surface portion 12 and is folded in a bellows shape. Accordingly, the gas flowing into the base portion 11 reaches the upper surface portion 13 after flowing through the rear surface portion 14 from the bottom to the top.

Further, the packing cloth 20A includes the bottom cloth portion 21, the front cloth portion 24 continuous with a front end of the bottom cloth portion 21, the upper cloth portion 23 continuous with an upper end of the front cloth portion 24, the rear cloth portion 22 continuous with a rear end of the upper cloth portion 23, and a right cloth portion and a left cloth portion (not shown) respectively continuous with right and left side ends of the rear cloth portion 22. Then, the opening portion 60 is formed offset to the rear side with respect to the pair of the lids 51. Specifically, the opening portion 60 is located below the rear lid 51b, and is formed across from the central portion in the front-rear direction of the upper surface portion 13 to the rear surface portion 14.

Further, the air bag 10A is disposed such that distances from the front corner portion 17 and the rear corner portion 19 to the pair of the lids 51 are substantially equal to each other in the state of being housed in the retainer 40.

With the air bag device 1A according to the first modification, the rear corner portion 19 and its peripheral portion of the air bag 10A is projected from the opening portion 60 by the gas from the inflator 30, to be in direct contact with the rear lid 51b in a biased manner. As a result, the expansion force of the air bag 10A is applied to the rear lid 51b in a biased manner, and the shearing force F of the tear line 55 is increased. Therefore, it is possible to cleave the tear line 55 easily and reliably.

Next, a second modification will be described. The air bag devices 1, 1A in the present embodiment and the first modification are configured such that the air bags 10, 10A are brought into contact with one of the pair of the lids 51 in a biased manner by adjusting (offsetting) a position of the opening portion 60 formed in the packing cloth 20, however, the present invention is not limited thereto, and it is sufficient that the air bag can be brought into contact with one of the pair of the lids 51 in a biased manner. In the second modification, an air bag device 1B, which is configured such that an air bag 10 (10B) can be brought into contact with one of the pair of the lids 51 in a biased manner without essentially requiring the packing cloth 20 and the opening portion 60, will be described in detail with reference to FIG. 7. Note that, the same components as the above-described embodiment are denoted by the same reference numbers, and the duplicated description will be omitted.

The air bag device 1B according to the second modification is characterized in that the expanded air bag 10 (10B) is brought into contact with one (the front lid 51a in the second modification) of the pair of the lids 51 in a biased manner, so that the tear line 55 is cleaved. Specifically, for example, a center line CL1 in the front-rear direction of the air bag 10B is offset forwardly with respect to a center line CL2 in the front-rear direction of the pair of the lids 51, so that the air bag 10B is brought into contact with the front lid 51a in a biased manner. That is, in the second modification, the air bag 10B itself is offset with respect to the pair of the lids 51, without the offset opening portion 60.

As shown in FIG. 7, the air bag 10B is housed in a retainer 40B in a state of being folded in a predetermined shape so as to be expanded and deployed by the gas from the inflator 30. Folding method of the air bag 10B and presence or absence of the packing cloth 20 are not particularly limited, however, it is preferable that the air bag 10B is expanded along the center line CL1 in the front-rear direction of the air bag 10B (see arrow P in FIG. 7). The tear line 55 of the lid member 50 is positioned on the center line CL2 in the front-rear direction of the pair of the lids 51. A turn-up portion 42c on the rear side of the retainer 40B is formed larger than a turn-up portion 42c on the front side of the retainer 40B in dimension in the front-rear direction. By attaching such a retainer 40B to the side wall portions 52 of the lid member 50, the center line CL1 in the front-rear direction of the air bag 10B is in a state of being offset forwardly with respect to the center line CL2 in the front-rear direction of the pair of the lids 51 (see dimension line Q in FIG. 7).

Next, an operation of the air bag device 1B according to the second modification will be described. With the air bag device 1B according to the second embodiment, since the center line CL1 in the front-rear direction of the air bag 10B is offset forwardly with respect to the center line CL2 in the front-rear direction of the pair of the lids 51, the air bag 10B expanded and deployed along the center line CL1 is brought into contact with the front lid 51a in a biased manner. As a result, since the expansion force (see the arrow P) of the air bag 10B is applied to the front lid 51a in a biased manner, it is possible to effectively generate the shearing force F in the tear line 55. Further, when the packing cloth 20 is not used, it is possible to efficiently cleave the tear line 55, because the expansion force P is not consumed to break the fragile portions 27 of the packing cloth 20.

The present embodiment, the first modification and the second modification have been described above in detail with reference to the accompanying drawings, however, the present invention is not limited thereto, and can be appropriately modified without departing from the scope and spirit of the invention.

For example, in the present embodiment and the first modification, it is configured such that the flow path of the gas from the base portion 11 to the upper surface portion 13 and the offset direction of the opening portion 60 correspond to each other, but the present invention is not limited thereto. For example, the flow path of the gas from the base portion 11 to the upper surface portion 13 and the offset direction of the opening portion 60 may be reverse to each other. Even in this case, since the air bag 10 is projected from the offset opening portion 60, it is possible to bring the air bag 10 into direct contact with one of the pair of the lids 51 in a biased manner.

Further, in the present embodiment and the first modification, the opening portion 60 is formed in the area upper than the upper end portions 42b of the peripheral walls 42 of the retainer 40, however, the present invention is not limited thereto, and for example, the arcuate portion 66 in front of (or behind) the opening portion 60 may overlap the peripheral walls 42 of the retainer 40.

Further, in the present embodiment and the first modification, the air bag 10 is brought into contact with only either one of the front lid 51a or the rear lid 51b at initial expansion, however, the present invention is not limited thereto, and the air bag 10 only has to be brought into contact with either of the front lid 51a or the rear lid 51b in a biased manner. Also in this case, since majority of the expansion force can be concentrated to one of the pair of the lids 51, it is possible to increase the shearing force F applied to the central tear line 55 as compared with a case where the air bag 10 is brought into contact with the pair of the lids 51 in a uniform manner.

Further, in the present embodiment and the first modification, the pair of the lids 51 are provided in the lid member 50 which is provided separately from the instrument panel 2, however, the present invention is not limited thereto, and for example, the pair of lids 51 and the tear line 55 may be formed directly in the instrument panel 2. In this case, since an amount of lightening the tear line 55 can be reduced, it is possible to prevent appearance of traces of the tear line 55 on a surface of the instrument panel 2 as well as to reduce the number of components and the number of manufacturing steps.

Further, in the second embodiment, it is configured such that the center line CL1 of the air bag 10B is offset with respect to the center line CL2 of the pair of the lids 51, however, the present invention is not limited thereto. For example, while the center line CL1 of the air bag 10B and the center line CL2 of the pair of the lids 51 correspond to each other, it may be configured such that the tear line 55 is offset, for example, rearwardly with respect to the center line CL2 of the pair of the lids 51. Even with this configuration, it is possible to bring the air bag 10B into contact with the front lid 51a in a biased manner.

REFERENCE SIGNS LIST

1: air bag device
2: instrument panel
10: air bag
10a: housing portion
11: base portion
12: front surface portion
13: upper surface portion
14: rear surface portion
17: front corner portion
20: packing cloth
27: fragile portion
30: inflator
40: retainer
50: lid member
51: pair of lids
51a: front lid
51b: rear lid
55: tear line
60: opening portion

The invention claimed is:
1. An air bag device comprising:
an air bag which is folded to be expanded by gas from an inflator;
a packing cloth for wrapping the folded air bag;
and a pair of front and rear lids which close a housing portion for the air bag and are both-opened by cleavage of a central tear line thereof upon expansion of the air bag,
wherein the air bag is housed below an instrument panel provided in a front portion of the vehicle, and is folded such that the gas from the inflator disposed on the lower side reaches an upper surface portion of the air bag through either a front surface portion or a rear surface portion of the air bag, wherein the packing cloth includes an opening portion, and wherein the opening portion is positioned at a substantially central portion in a left-right direction of a vehicle with respect to the pair of front and rear lids, and is offset to a front windshield side.

2. The air bag device according to claim 1, wherein the opening portion is disposed across from the upper surface portion of the folded air bag to the front surface portion of the air bag.

3. The air bag device according to claim 1, wherein upper surfaces of the air bag and the packing cloth are inclined so as to approach the pair of the lids as they go from the rear to the front.

4. The air bag device according to claim 1, wherein the air bag is folded such that the gas from the inflator disposed on the lower side reaches the upper surface portion of the air bag through the front surface portion of the air bag, and wherein the front surface portion side of the air bag is closer to the lids than the rear surface portion side of the air bag.

5. The air bag device according to claim 1, wherein the air bag is housed in a box-like retainer which is open at upper end portions thereof in a state of being wrapped in the packing cloth, and wherein the opening portion of the packing cloth is provided in an area upper than the upper end portions of side walls of the retainer.

6. The air bag device according to claim 1, wherein a plurality of engaging portions for engaging with the retainer are provided spaced from each other in the left-right direction at one end portion of the packing cloth either forward or rearward of the vehicle, and wherein a width dimension of the opening portion of the packing cloth in the left-right direction of the vehicle is reduced as it goes either forwardly or rearwardly of the vehicle.

7. The air bag device according to claim 1, wherein a peripheral edge of the opening portion of the packing cloth is composed of a plurality of linear portions and arcuate portions provided between the linear portions.

8. The air bag device according to claim 7, wherein the packing cloth includes perforated fragile portions to be broken by expansion of the air bag at the left and right sides of the opening portion, and wherein each end portion on the opening portion side of the fragile portions is continuous with the linear portion.

9. The air bag device according to claim 1, wherein the opening portion is an opening portion for projecting a portion of the air bag upon expansion of the air bag, and is disposed such that the portion of the air bag projected from the opening portion is brought into contact with one of the pair of lids in a biased manner.

10. The air bag device according to claim 9, wherein the air bag is configured such that the portion of the air bag projected from the opening portion is brought into substantially perpendicular contact with the one of the pair of lids.

11. The air bag device according to claim 1, wherein the air bag to be expanded is brought into contact with one of the pair of lids in a biased manner, to cleave the tear line.

12. The air bag device according to claim 1, wherein by adjusting a position of the opening portion provided in the packing cloth, the air bag is brought into contact with one of the pair of lids in a biased manner, to cleave the tear line.

13. The air bag device according to claim 1, wherein the opening portion is an opening portion for projecting a portion of the air bag upon expansion of the air bag.

14. An air bag device comprising:
an air bag which is folded to be expanded by gas from an inflator;
a packing cloth for wrapping the folded air bag;
and a pair of front and rear lids which close a housing portion for the air bag and are both-opened by cleavage of a central tear line thereof upon expansion of the air bag,
wherein the air bag is housed below an instrument panel provided in a front portion of the vehicle,
wherein the packing cloth includes an opening portion and perforated fragile portions which are continuous with the opening portion and are broken by expansion of the air bag, and
wherein the opening portion is positioned at a substantially central portion in a left-right direction of a vehicle with respect to the pair of front and rear lids, and is offset to a front windshield side.

* * * * *